Nov. 25, 1941.  W. E. ANDERSON ET AL  2,264,108
MATERIAL FEEDER
Filed June 3, 1940
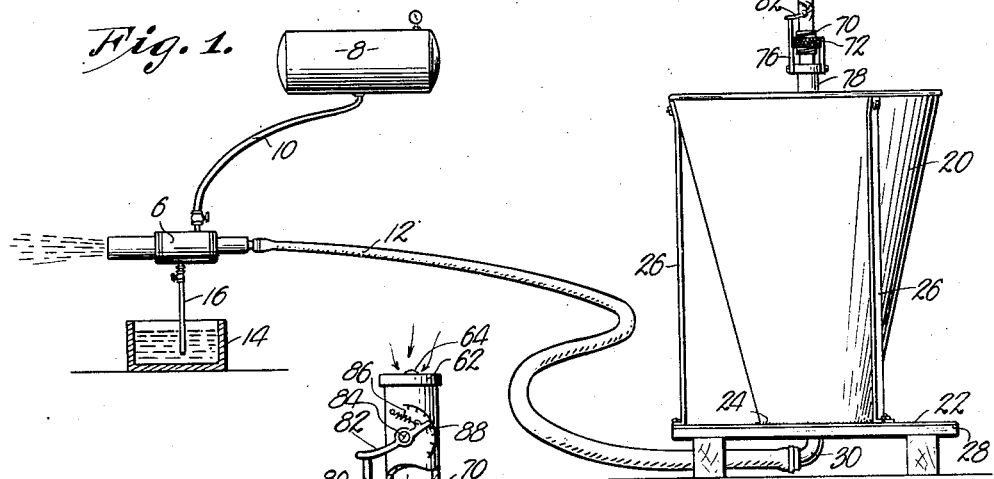
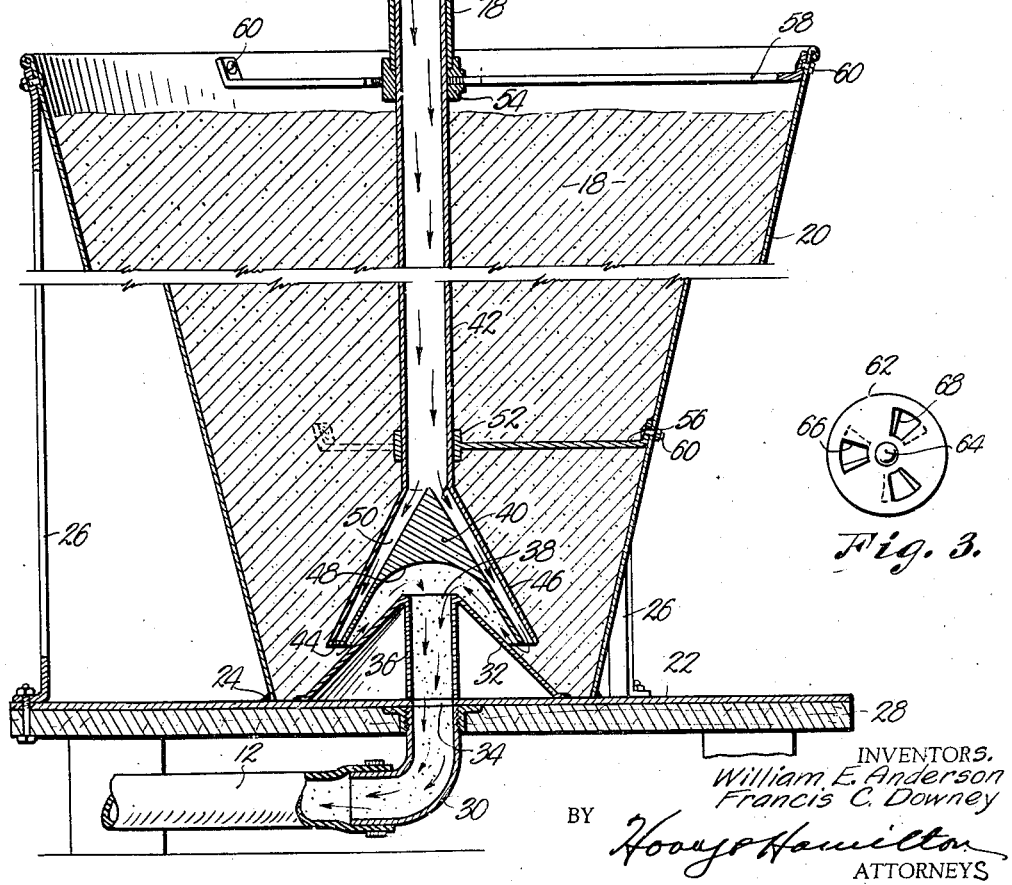
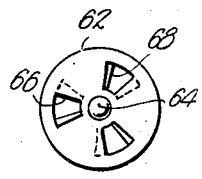
INVENTORS.
William E. Anderson
Francis C. Downey
BY Hooys Hamilton
ATTORNEYS Patented Nov. 25, 1941

2,264,108

UNITED STATES PATENT OFFICE 2,264,108

MATERIAL FEEDER

William E. Anderson and Francis C. Downey, Kansas City, Mo., assignors to Jo Zach Miller III, trustee, Kansas City, Mo.

Application June 3, 1940, Serial No. 338,579

6 Claims. (Cl. 302—52)

This invention relates to material feeders for apparatus employed in the placement of cementitious substances and the primary object is to provide a feeder whereby the nozzle of the apparatus may be supplied with a constant amount of sand and cement that is drawn thereto through the medium of suction created therein and in a hose extending to the hopper of the feeder.

One of the important aims of this invention is to provide a material feeder having structure for gauging the amount of dry substance fed through the outlet port thereof, the amounts being variable during the operation of the apparatus by manually operable novel parts included in the feeder.

A yet further aim of this invention is the provision of a material feeder having as a part thereof, a specially formed wall near the outlet port, which wall cooperates with a flared, adjustable pipe in such a manner as to create an even suction in an annular path circumscribing the outlet port so that dry material may be drawn from the hopper of the feeder in constant, even quantities and without the employment of movable elements.

A still further object of this invention is to provide a material feeder having a specially formed hopper and unique means for drawing dry material from the bottom of said hopper, said parts comprising a manually adjustable element and a scale which indicates to the operator the size of the annular opening at the bottom of the hopper, through which material is being drawn.

Additional objects of this invention, advantages arising from the use of a material feeder, made in accordance therewith, and the manner of combining the feeder with cement emplacing apparatus, will appear during the course of the following specification, referring to the accompanying drawing wherein:

Figure 1 is a diagrammatic view of apparatus for placing cementitious substances having as an element thereof, a material feeder embodying this invention.

Fig. 2 is an enlarged condensed vertical fragmentary sectional view through the material feeder; and Fig. 3 is a top plan view of the valve forming a part of the air intake pipe of the apparatus.

The material feeder contemplated is specially designed to supply dry substances, such as sand and cement, to a nozzle 6, which is made as disclosed in our co-pending application, Serial No. 286,240, filed July 24, 1939, now Patent No. 2,231,489.

This nozzle 6 is in communication with an air tank 8, through the medium of tube 10, and as a result of such relation of parts, a suction is established in nozzle 6 which draws material through flexible hose 12 so that it is mixed with water from tank 14. Tube 16 interconnects nozzle 6 and tank 14.

In equipment where dry material and water is mixed at the nozzle 6, it is necessary that the sand and cement, for instance, be evenly introduced to nozzle 6 and that no pulsating effect be present. An even, constant and uninterrupted flow of material 18 is insured if the feeder is made as illustrated in the drawing. This material feeder comprises a hopper 20 in the form of an inverted, hollow frusto-conical body.

The side walls of hopper 20 are inclined inwardly and downwardly from the open top and are joined to bottom plate 22 by welding as at 24. Supports 26 extending vertically from plate 22 secure hopper 20 in the operative position on platform 28. This platform is elevated above the ground or other supporting surface, so that one end of flexible hose 12 may be joined to coupling 30, as shown in Fig. 2.

A deflector 32 overlies outlet port 34 of the bottom 22 and extends upwardly into hopper 20 on the axis thereof. Deflector 32 is frusto-conical and a tube 36 lengthens outlet port 34 so that the mouth 38 thereof is elevated above plate 22.

The angle of inclination of the outer upper surface of deflector 32 is substantially 45° so that the lower edge of an air distributing cone 40, which has an angle of inclination of substantially 22½° may be moved toward and from deflector 32 and create a line of contact when pipe 42 is at the lower end of its reciprocating path of travel.

Air distributing cone 40 is supported by a number of radially extending spacers 44, that extend inwardly from the flared portion 46 of pipe 42. A spherical surface 48 formed within distributing cone 40 overlies the upper portion of deflector 32, and especially outlet port 34.

An air space 50 is provided between the outer inclined surface of distributing cone 40 and the inner inclined surface of flared portion 46 of pipe 42. Pipe 42 extends vertically and upwardly through material 18 in hopper 20 and is slidably supported by bearings 52 and 54 mounted on braces 56 and 58 respectively that are secured to hopper 20 through the medium of bolts 60 or the like.

Tube 42 has a valve member in the form of a cap 62 on the upper end thereof. This valve member is rotatably mounted by a central bolt 64 and openings 66 in cap 62 may be brought into register with underlying openings 68 formed in the end wall of pipe 42.

Screw-threads 70 on pipe 42 are engaged by internally threaded, rotatable and adjustable ring 72 that is mounted on shoulders 74 of arms 76. These arms have their lowermost ends secured to a short tube 78 mounted in upper bearing 54, which lengthens the bearing surface that serves to maintain pipe 42 in a true vertical position.

One of arms 76 has an extension 80 thereon that is engaged by pointer 82 pivotally mounted as at 84 on pipe 42. A spring 86 yieldably maintains one free end of pointer 82 against extension 80, and the other free end of pointer 82 rides over a scale 88, which indicates to the operator the position of the lower edge of distributing cone 40 with respect to the surface of the deflector 32.

The material feeder is easy to operate in that dry material 18 is maintained in hopper 20 and flows by gravity toward plate 22. Air is drawn to nozzle 6 through flexible hose 12 and the amount of material passing into hose 12 is governed by the passage of air downwardly through pipe 42 in the direction of the arrows shown therein. As the air travels through space 50, it passes inwardly and upwardly to a point above outlet port 34 from whence it is passed to nozzle 6 by way of coupling 30 and hose 12.

The maximum movement of pipe 42 should be 1 in. and threads 70 are formed to present eight to an inch, so that upon one complete revolution of ring 72, pipe 42 will move up or down, as the case may be, ⅛ in. Pointer 82 will indicate in eighths of an inch, the movement of the pipe.

It has been found through actual practice and in work, that a material feeder embodying the present invention and made as illustrated and described, will provide a constant, even flow of dry material to nozzle 6 without pulsating, which results in the production of a cement of uniform consistency.

Obviously, the specific form of the material feeder may be changed without departing from the scope of the appended claims.

Having thus described the invention, what is claimed as new and desired to be secured by Letters Patent is:

1. In a material feeder of the character described, a hopper having an outlet port through the bottom thereof; an air intake pipe having an edge at one end thereof circumscribing the said port; and means for moving the pipe toward and from the hopper around the port to vary the space between the pipe and the hopper, said means comprising a bearing and a ring rotatably carried by the bearing and in screw-threaded engagement with the pipe whereby to move the pipe longitudinally as the ring is rotated, said pipe having a pointer and cooperating scale mounted thereon adapted to indicate the distance between the said edge of the pipe and the hopper.

2. A material feeder of the character described comprising a hopper having a downwardly and inwardly inclined side wall and a frusto-conical bottom provided with an outlet port at the apex thereof; bearings in the hopper on the axis thereof; a vertical pipe slidable in the bearings for longitudinal movement toward and from the said bottom; and means for securing the pipe in position with its lower annular edge circumscribing the upper portion of the frusto-conical bottom in spaced relation thereto below said port.

3. A material feeder of the character described comprising a hopper having a downwardly and inwardly inclined side wall and a frusto-conical bottom provided with an outlet port at the apex thereof; bearings in the hopper on the axis thereof; a vertical pipe slidable in the bearings for longitudinal movement toward and from the said bottom; and means for securing the pipe in position with its lower annular edge circumscribing the upper portion of the frusto-conical bottom in spaced relation thereto, the lower portion of said pipe being flared downwardly and outwardly at a lesser degree of inclination than the angle of inclination of the frusto-conical bottom whereby to establish a space between the flared portion of the pipe and said bottom, which space progressively increases in size as the apex of the frusto-conical bottom is approached.

4. A material feeder of the character described comprising a hopper having a downwardly and inwardly inclined side wall and frusto-conical bottom provided with an outlet port at the apex thereof; bearings in the hopper on the axis thereof; a vertical pipe slidable in the bearings for longitudinal movement toward and from the said bottom; and means for securing the pipe in position with its lower annular edge circumscribing the upper portion of the frusto-conical bottom in spaced relation thereto, the lower portion of said pipe being flared downwardly and outwardly, said flared portion of the pipe having a distributing cone therein in spaced relation thereto, whereby air from the pipe is drawn inwardly and upwardly along the upper side of the frusto-conical bottom with entrained material toward the outlet port.

5. A material feeder of the character described comprising a hopper having a downwardly and inwardly inclined side wall and a frusto-conical bottom provided with an outlet port at the apex thereof; bearings in the hopper on the axis thereof; a vertical pipe slidable in the bearings for longitudinal movement toward and from the said bottom; and means for securing the pipe in position with its lower annular edge circumscribing the upper portion of the frusto-conical bottom in spaced relation thereto, the lower portion of said pipe being flared downwardly and outwardly, said flared portion of the pipe having a distributing cone therein in spaced relation thereto whereby air from the pipe is drawn inwardly and upwardly along the upper side of the frusto-conical bottom with entrained material toward the outlet port, said distributing cone having a spherical inner surface overlying the outlet port.

6. A material feeder of the character described comprising a hopper having a downwardly and inwardly inclined side wall and a frusto-conical bottom provided with an outlet port at the apex thereof; bearings in the hopper on the axis thereof; a vertical pipe slidable in the bearings for longitudinal movement toward and from the said bottom; and means for securing the pipe in position with its lower annular edge circumscribing the upper portion of the frusto-conical bottom in spaced relation thereto, the lower portion of said pipe being flared downwardly and outwardly, said flared portion of the pipe having a distributing cone therein in spaced relation thereto whereby air from the pipe is drawn inwardly and upwardly along the upper side of the frusto-conical bottom with entrained material toward the outlet port, said distributing cone having a spherical inner surface overlying the outlet port, said pipe having a valve at the other end thereof for controlling the amount of air entering the pipe.

WILLIAM E. ANDERSON.
FRANCIS C. DOWNEY.